(12) United States Patent
Inaguma et al.

(10) Patent No.: US 7,199,548 B2
(45) Date of Patent: Apr. 3, 2007

(54) DRIVE CONTROL APPARATUS AND METHOD OF ALTERNATING CURRENT MOTOR

(75) Inventors: Yukio Inaguma, Nagoya (JP); Hideo Nakai, Nisshin (JP); Hiroki Ohtani, Aichi-gun (JP); Masaki Okamura, Toyota (JP)

(73) Assignees: Toyota Jidosha Kabushiki Kaisha, Toyota (JP); Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 11/175,323

(22) Filed: Jul. 7, 2005

(65) Prior Publication Data

US 2006/0006825 A1  Jan. 12, 2006

(30) Foreign Application Priority Data

Jul. 12, 2004  (JP) .............................. 2004-204792
May 24, 2005 (JP) .............................. 2005-151165

(51) Int. Cl.
*H02P 1/24* (2006.01)
(52) U.S. Cl. .................... 318/727; 318/701; 318/700; 318/713; 318/715; 318/432; 318/632
(58) Field of Classification Search ................ 318/727, 318/701, 700, 713, 715, 799, 808, 805, 432, 318/632, 610, 611; 324/772; 388/804
See application file for complete search history.

(56) References Cited

U.S. PATENT DOCUMENTS

2002/0180402 A1* 12/2002 Koide et al. ................. 318/727
2003/0062859 A1*  4/2003 Amann et al. ............... 318/114

FOREIGN PATENT DOCUMENTS

| EP | 1 263 125 A2 | 12/2002 |
| JP | A 10-014273 | 1/1998 |
| JP | A 2000-050689 | 2/2000 |
| JP | A 2001-028892 | 1/2001 |

* cited by examiner

*Primary Examiner*—Karen Masih
(74) *Attorney, Agent, or Firm*—Oliff & Berridge, PLC

(57) ABSTRACT

A drive control apparatus, which controls an AC motor subjected to rotational drive by applying a rectangular wave voltage thereto, comprising: an actual torque detection section for detecting an actual torque value T outputted from the AC motor; an estimated torque calculation section for calculating an estimated torque value Tm based on a motor model with the AC motor in a simulated state; and a voltage phase calculation section wherein the voltage phase calculation section calculates a first voltage phase $\phi fb$ based on the actual torque value T and a command torque value T*, and a second voltage phase $\phi ff$ based on the estimated torque value Tm and the command torque value T* respectively, and outputs a value obtained by making the voltage phase subjected to weighting addition, as a voltage phase $\phi v$.

13 Claims, 13 Drawing Sheets

DRIVE CONTROL APPARATUS AND METHOD OF ALTERNATING CURRENT MOTOR

BACKGROUND OF THE INVENTION

1. Field of the Invention

The invention relates to a drive control apparatus and method for controlling an alternating current motor, hereinafter referred to as an "AC motor", subjected to rotational drive by applying a rectangular wave voltage thereto.

2. Description of the Related Art

For outputting a predetermined command torque from a motor, it is widely known to use a technique of controlling voltage applied to the motor. For example, Japanese Patent Laid-Open Publication Nos. 2001-28892 and 2000-50689 respectively disclose a drive control apparatus which calculates such a voltage phase so as to eliminate deviation of an output torque value from a command torque value by feeding back an output torque value of a motor. Japanese Patent Laid-Open Publication No. 2001-28892 obtains an output torque value based on respective phase currents detected by a detector, a command voltage value, and an angular speed. On the other hand, Japanese Patent Laid-Open Publication No. 2000-50689 obtains an output torque value using a torque sensor.

Furthermore, Japanese Patent Laid-Open Publication No. Hei 10-14273 discloses a control apparatus of a motor for controlling an inverter phase angle so that a command torque value may be outputted. This control apparatus obtains a torque compensation angle based on a deviation of an output torque value from a command torque value, and an angle (a voltage vector angle) to the flux axial direction of a voltage vector using a motor model with a motor in a simulated state and the command torque value. An inverter phase is calculated based on the obtained torque compensation angle and the voltage vector angle.

In a detection process of an output torque value, usually, there is provided a low pass filter for filtering out noise. Especially, for calculating the output torque value based on detected values of respective phase currents, noise filtering by the low pass filter is essential because the detected current value includes a harmonic component. However, use of the low pass filter causes a time lag in the obtained output torque value, thus degrading torque response. The drive control apparatuses disclosed in Japanese Patent Laid-Open Publication Nos. 2001-28892 and 2000-50689, which only feed back the output torque, have a disadvantage that the torque response of a motor is low.

A control apparatus disclosed in the Japanese Patent Laid-Open Publication No. Hei 10-14273 makes combined use of feedback control and feed-forward control, which is capable of suppressing an effect of time lag in an output torque. The control apparatus disclosed in Japanese Patent Laid-Open Publication No. Hei 10-14273 calculates a voltage vector angle from a torque command. That is, it may be said that the voltage vector is a parameter with state quantity of a motor not considered. Therefore, there is a problem that a command torque value that changes in a stepped manner will also cause a voltage vector angle to change in a stepped manner, thus causing the output torque of the motor to have an overshoot state. In other words, conventional drive control of a motor has a disadvantage that low response or overshoot causes a control error, especially a significant control error in a transient region.

In view of the aforementioned problems, it is an advantage of the present invention to provide a drive control apparatus and method capable of further suppressing a control error.

SUMMARY OF THE INVENTION

To achieve the aforementioned advantage, the drive control apparatus of the present invention, which controls an AC motor subjected to rotational drive by applying rectangular wave voltage thereto, comprises: actual torque detection means for detecting an actual torque value outputted from the AC motor; estimated torque calculation means for calculating an estimated torque value based on a motor model with the AC motor in a simulated state; and voltage phase calculation means for calculating a voltage phase based on the actual torque value, the estimated torque value and a predetermined command torque value, wherein the voltage phase calculation means adds an actual parameter based on the actual torque value calculated in the calculation process of the voltage phase to an estimated parameter based on the estimated torque value in a predetermined proportion, and calculates the voltage phase based on the obtained value.

A drive control apparatus according to another embodiment of the present invention, controlling an AC motor subjected to rotational drive by applying rectangular wave voltage thereto, comprises: estimated torque calculation means for calculating an estimated torque value based on a motor model with the AC motor in a simulated state and inverter output voltage; and voltage phase calculation means for calculating a voltage phase of command voltage based on the calculated estimated torque value and a predetermined command torque value.

A drive control method according to still another embodiment of the invention, controlling an AC motor subjected to rotational drive by applying rectangular wave voltage thereto, comprises: an actual torque detection process for detecting an actual torque value outputted from the AC motor; an estimated torque calculation process for calculating an estimated torque value based on a motor model with the AC motor in a simulated state; and a voltage phase calculation process for calculating a voltage phase of command voltage based on the actual torque value, the estimated torque value and a predetermined command torque value, especially a voltage phase calculation process for calculating a voltage phase based on a value obtained by adding an actual parameter based on an actual torque value calculated in a voltage phase calculation process of a voltage phase and an estimated parameter based on the estimated torque value in a predetermined proportion.

BRIEF DESCRIPTION OF THE DRAWINGS

Preferred embodiments of the present invention will be described in detail based on the following figures, wherein.

DESCRIPTION OF PREFERRED EMBODIMENTS

Figure 1:
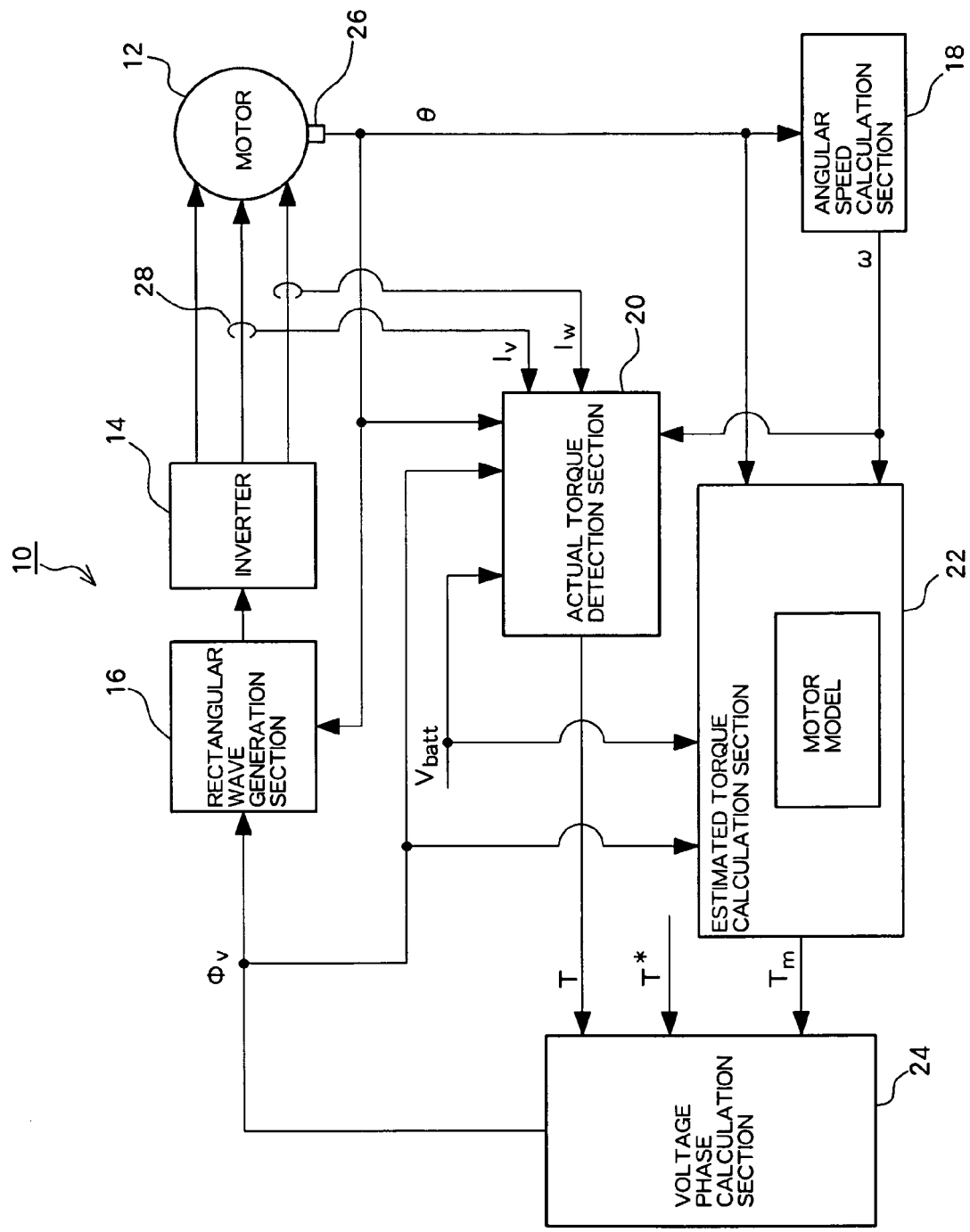
FIG. 1 is a basic schematic block diagram of a drive control apparatus according to one embodiment of the present invention.

Hereinafter, with reference to the drawings, the description will be made of embodiments according to the present invention. FIG. 1 is a basic schematic block diagram of a drive control apparatus for an AC motor 12 according to one embodiment of the present invention. The input-output relationship of each section shown in FIG. 1 is a typical example and may be a relationship other than the one illustrated.

The drive control apparatus 10 controls the AC motor 12 driven by a rectangular wave voltage, and calculates a voltage phase $\phi v$ corresponding to a predetermined command torque value T* and applies rectangular wave voltage to the AC motor 12.

An inverter 14 is connected to the AC motor 12. The inverter 14 receives power supply from a power source, not shown, and passes current through stator windings for respective U, V and W phases of the AC motor 12. On a power supply line from the inverter 14 to the AC motor 12, there is provided a current sensor 28 to detect current values being supplied to the respective phase windings of the AC motor 12. The inverter 14 is connected with a rectangular wave generation section 16, which produces a SW signal of rectangular wave voltage for each phase, and the SW signal permits the inverter 14 to be subjected to switching control.

The rectangular wave generation section 16 controls a phase of the SW signal based on a voltage phase $\phi v$ obtained by a voltage phase calculation section 24 described below and a rotor angle $\theta$ as an output from a resolver 26 provided next to the AC motor 12.

An actual torque detection section 20 detects an actual torque value T as a torque value actually outputted from the motor. Detection of the actual torque value T can be performed in a wide variety of ways. As one of preferred way, an actual torque value T is calculated based on a current value detected by the current sensor 28. For example, supplied power is calculated by a product sum of a detected current and a command voltage value, and a value obtained by dividing the calculated power by an angular speed is taken as an actual torque T. As another method, magnetic torque and inductance torque are calculated from the detected current, and a sum of the m may be taken as the actual torque value T. Moreover, as another embodiment, an output of a torque sensor attached onto the AC motor 12 may be taken as the actual torque value T.

The actual torque detection section 20 filters out noise with a low pass filter in the detection process of the actual torque value T. This is because the value detected from the AC motor 12 includes noise. Especially, since the current value detected by the current sensor 28 includes a high-frequency component, the low pass filter is mandatory for calculation of the actual torque value T based on the detected current. The noise filtering-out may be applied directly to the detected current or to the actual torque value T calculated from the detected current.

In the low pass filter, usually, a fixed time constant exists. Therefore, in the actual torque value T which has passed through the low pass filter, a time lag corresponding to the time constant of the low pass filter always exists. The time lag impairs torque response in motor control. Therefore, this embodiment uses an estimated torque calculation section 22 and a voltage phase calculation section 24 described below, thus achieving high response.

The estimated torque calculation section 22 obtains an estimated torque value Tm of the AC motor 12. The estimated torque value Tm is calculated based on a motor model with the AC motor 12 in a simulated state. The motor model has a mathematical model obtained by approximating a current value supplied with a command voltage value, an inductance and an angular speed. By inputting the command voltage value, the inductance and the angular speed, an estimated current value supplied to the AC motor 12, hereinafter referred to an "estimated current value" can be calculated. The mathematical model for calculating the estimated current value is an observer constructed out of a Kalman filter in a preferred embodiment. That is, by inputting the detected current value into the observer and sequentially evaluating an error between the estimated current value and the detected current value, the estimated current value is calculated. By dividing a product sum of the estimated current value and the command voltage value by an angular speed, an estimated torque value Tm of the AC motor 12 is obtained. As another embodiment, magnetic torque and inductance torque are calculated, a sum of which may be taken as the estimated torque value Tm.

In any case, a command voltage value used to calculate the estimated current value and the estimated torque value is a value before it undergoes rectangular wave conversion. That is, the estimated current value and the estimated torque value are calculated with a value different from a voltage actually inputted into the AC motor 12. The inductance used to calculate the estimated current value and the estimated torque value may be a fixed value or a variable. Especially, for a motor generating magnetic flux saturation, use of the inductance varying with motor constant variation is preferable to reflect an inductance variation due to magnetic flux saturation on the estimated value. As the command voltage value and the angular speed, an instantaneous value or a fundamental wave component may be used.

Figure 2:
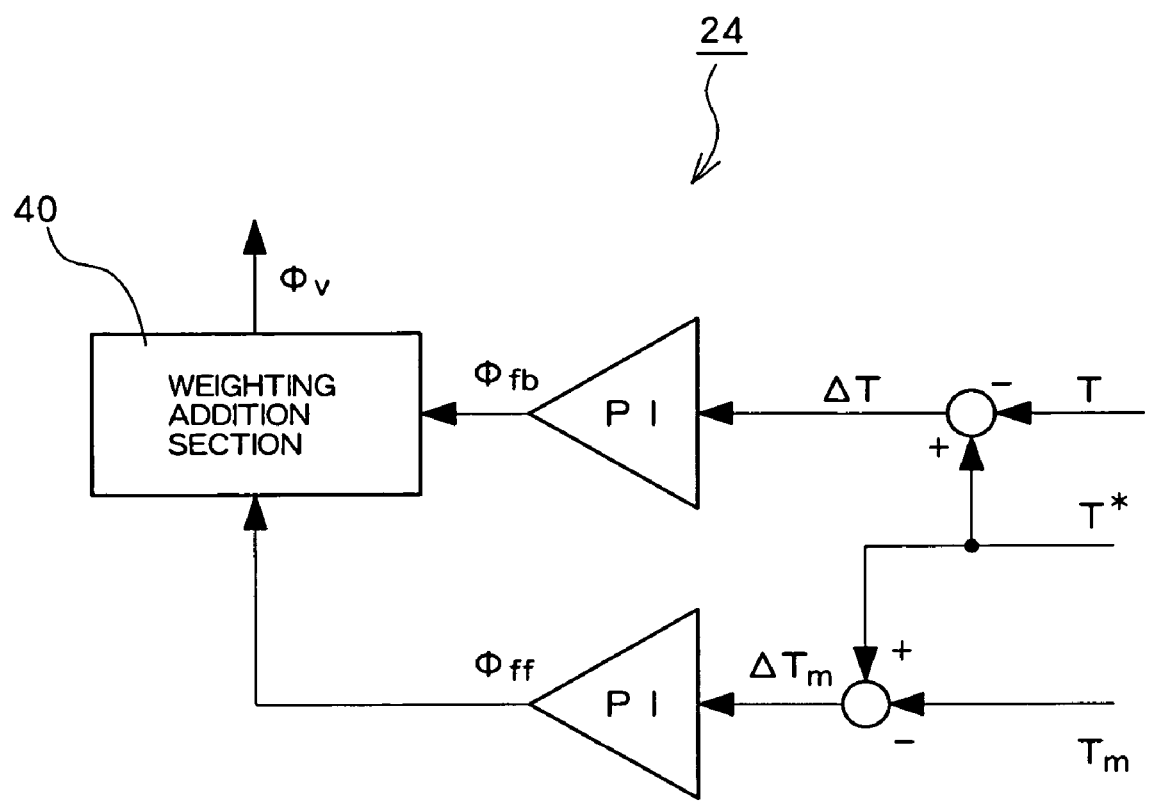
FIG. 2 is a detail view of a voltage phase calculation section in FIG. 1.
Figure 3:
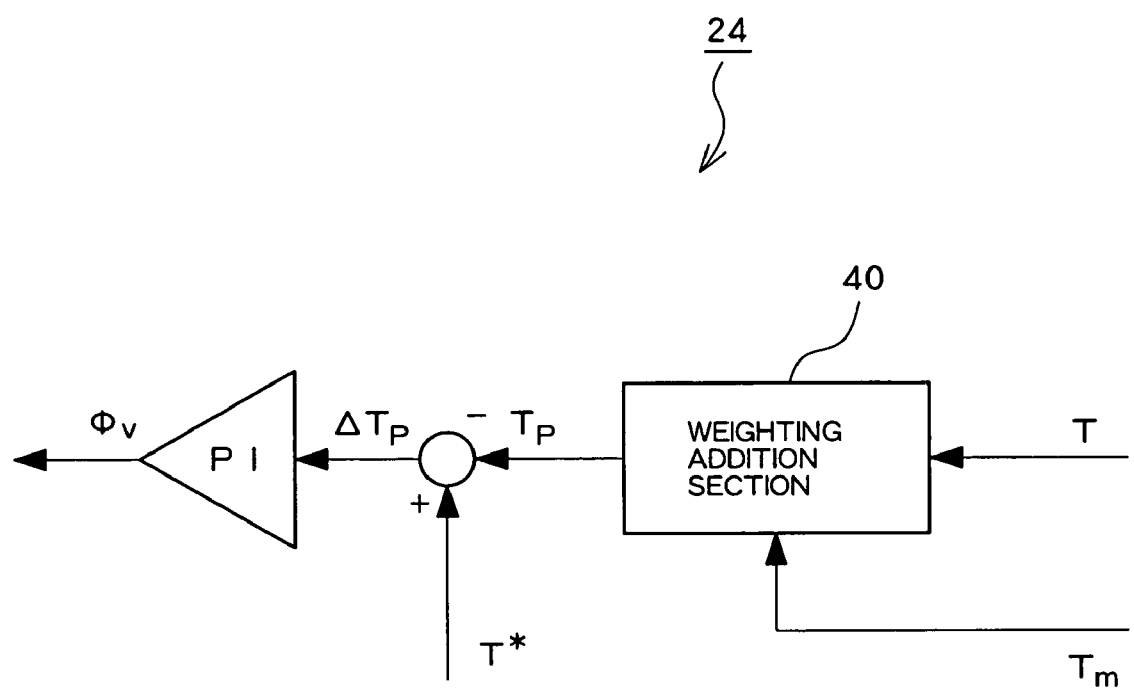
FIG. 3 is a schematic block diagram illustrating another configuration of a voltage phase calculation section.

Referring to FIG. 2, the voltage phase calculation section 24 is described below. FIG. 2 is a detail view of the voltage phase calculation section 24. The voltage phase calculation section 24 calculates such a voltage phase $\phi v$ that the AC motor 12 can output a command torque value T*.

Specifically, a first voltage phase $\phi fb$ of such a voltage phase as to eliminate a deviation $\Delta T$ between an actual torque value T and a command torque value T* is calculated. Next, a second voltage phase $\phi ff$ of such a voltage phase as to eliminate a deviation $\Delta Tm$ between the estimated torque Tm and the command torque value T* is calculated. A value obtained by weighting addition of the first voltage phase φfb and the second voltage phase φff in a prescribed proportion is taken as a voltage phase φv.

It may be said that the first voltage phase φfb is the voltage phase obtained by feedback control. Use of only the voltage phase φfb cannot prevent generation of a time lag corresponding to a time constant of a low pass filter. Therefore, weighting addition of the second voltage phase φff calculated from the estimated torque value without time lag improves torque response. The second voltage phase φff is calculated from the estimated torque value and may be taken as a voltage phase with state quantity of the motor considered. Even if the command torque value T* changes in a stepped manner, the second voltage phase φff changes continuously with the state quantity of the motor. Therefore, the voltage phase φv from the weighting addition of the second voltage phase φff and the first voltage phase φfb also changes continuously, thus preventing overshoot. Namely, the weighting addition of the first voltage phase φfb and the second voltage phase φff improves response while preventing torque overshoot, thus suppressing a control error.

The calculation methods of the first voltage phase φfb and the second voltage phase φff may use various types of control technologies which have been conventionally proposed, such as technologies of P control, PI control and PID control.

The proportion of the weighting addition may be a fixed value, but a variable is preferable which changes with an operating status such as a changing rate or magnitude of a command torque value. For example, it is desirable to take such a value as to obtain a higher proportion of the second voltage phase φff as a change rate of a command torque value is higher.

Figure 4:
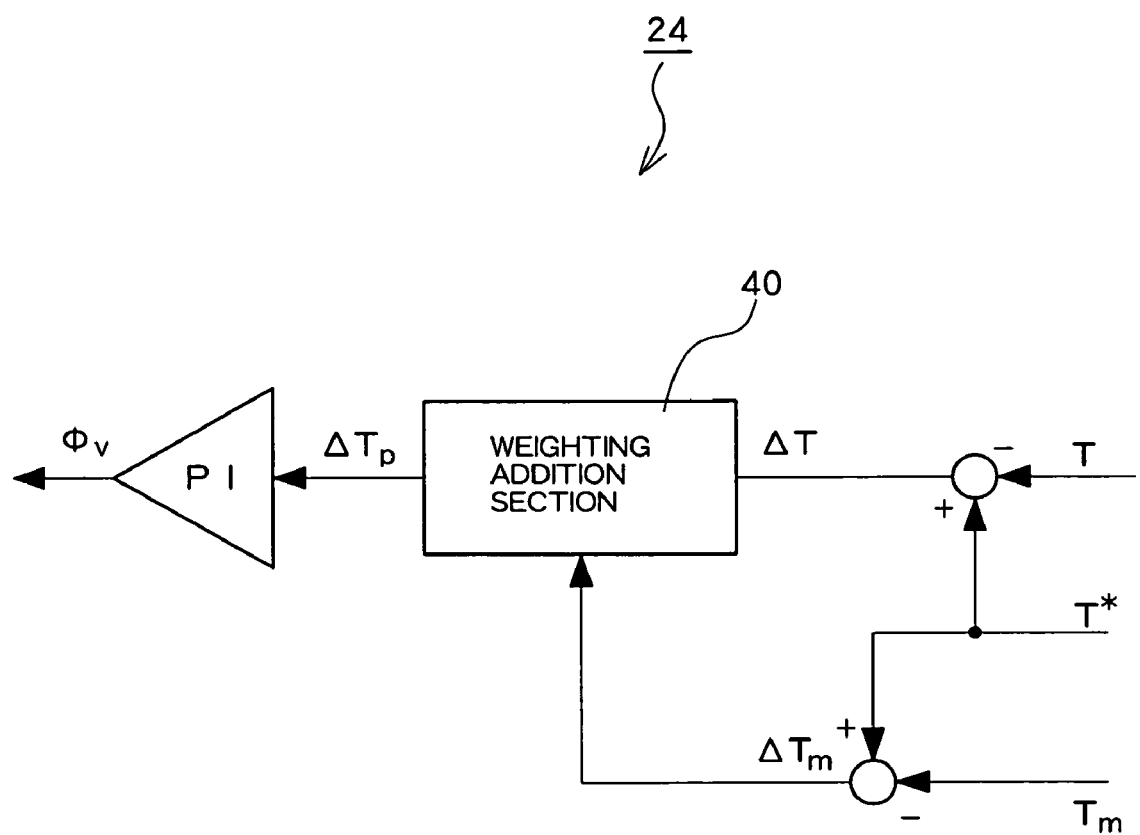
FIG. 4 is a schematic block diagram illustrating still another configuration of a voltage phase calculation section.

The weighting addition may be made before the calculation of two types of voltage phases φff, φfb. By making the weighting addition of the actual torque value T and the estimated torque value Tm, the voltage phase φv may be calculated based on a deviation ΔTp of a torque value Tp after the calculation from a command torque value T*. As shown in FIG. 4, by making a deviation ΔT of the actual torque value T from the command torque value T* and a deviation ΔTm of the estimated torque value Tm from the command torque value T* undergo weighting addition, the voltage phase φv may be calculated based on a deviation ΔTp after the addition.

After the calculation of the voltage phase φv, a phase limiter may be provided. The phase limiter restricts the voltage phase φv to a predetermined range, for example, 90° to −90°. If the calculated voltage phase φv is in excess of 90°, it is clipped to 90°.

Figure 5:
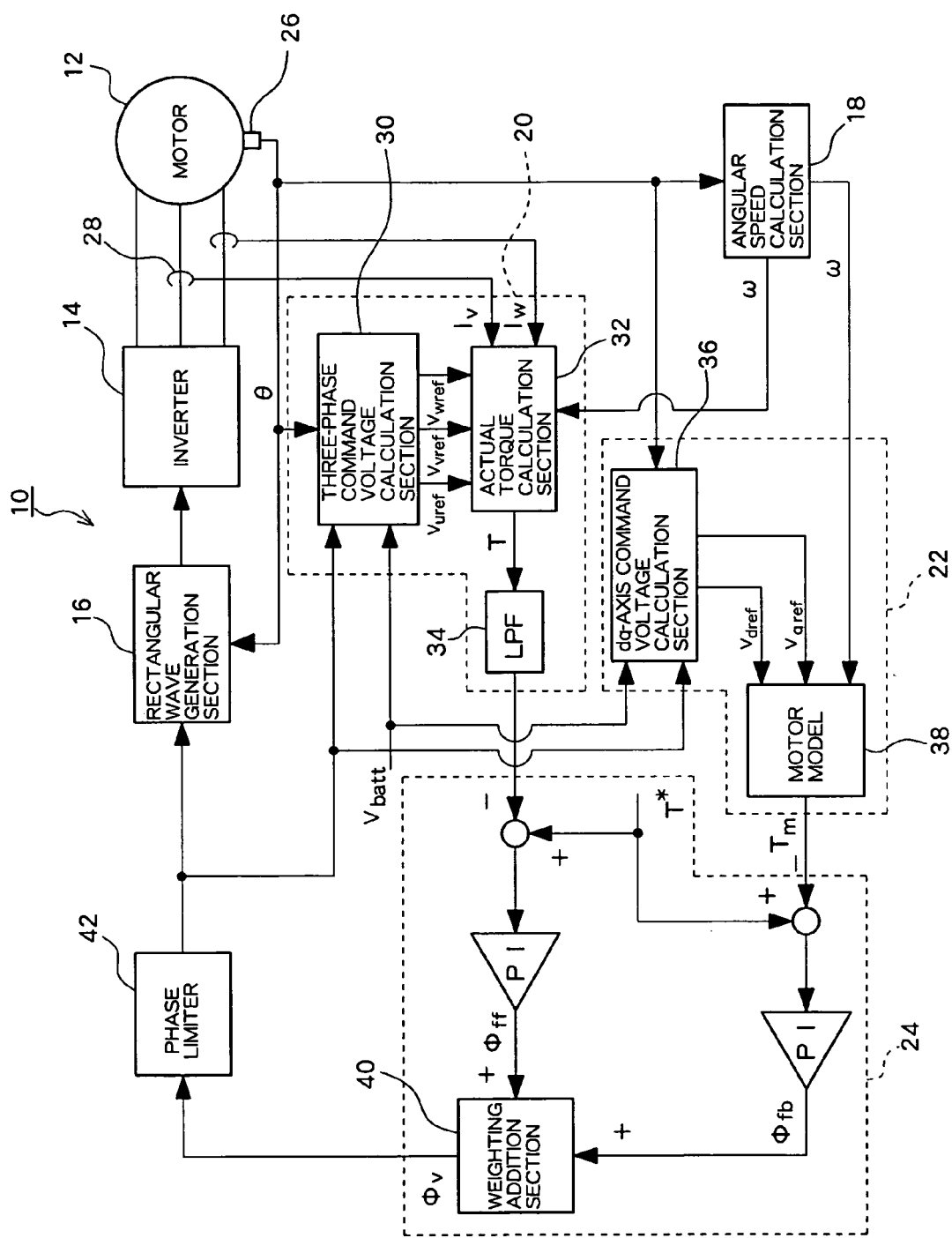
FIG. 5 is a schematic block diagram illustrating a further detailed configuration of a drive control apparatus.

Next, referring to FIG. 5, a further detailed example of a drive control apparatus is described below. FIG. 5 shows an example of a drive control apparatus. In the drive control apparatus 10, an actual torque value T is calculated from three-phase supply currents (detected values) Iu, Iv, Iw, three-phase command voltage values Vuref, Vvref, Vwref and an angular speed ω. Therefore, the three-phase current values Iu, Iv, Iw are inputted into an actual torque detection section 20 from a current sensor 28, and the angular speed ω is inputted from an angular speed calculation section. The actual torque detection section 20 is provided with a three-phase command voltage calculation section 30, and the three-phase command voltage values Vuref, Vvref, Vwref are calculated from a battery voltage Vbatt and a voltage phase φv (a value on q-axis taken as 0°). The three-phase command voltage values Vuref, Vvref, Vwref can be calculated from the following equation (1).

$$Vuref = -(\sqrt{6}/\pi) \cdot Vbatt \cdot \sin(\theta + \phi v)$$
$$Vvref = -(\sqrt{6}/\pi) \cdot Vbatt \cdot \sin(\theta + \phi v - 2\pi/3) \quad (1)$$
$$Vwref = -(\sqrt{6}/\pi) \cdot Vbatt \cdot \sin(\theta + \phi v + 2\pi/3)$$

The calculated three-phase command voltage values Vuref, Vvref, Vwref are inputted into the actual torque calculation section 32. The actual torque calculation section 32 calculates an actual torque value by dividing a product sum (a power value) of the three-phase command voltage values Vuref, Vvref, Vwref and three-phase supply current values Iu, Iv, Iw by an angular speed ω. Namely, the actual torque value T is calculated from the following equation (2):

$$T = (Vuref \cdot Iu + Vvref \cdot Iv + Vwref \cdot Iw)/\omega \quad (2)$$

The calculated actual torque value T is inputted into the voltage phase calculation section 24 after the low pass filter 34 filters out noise.

An estimated torque value Tm is calculated based on the motor model. Specifically, dq-axis estimated current values Idsim, Iqsim are calculated based on the mathematical model shown in the expression (3), and are substituted into the following equation (4) to calculate the estimated torque value Tm.

$$\frac{d}{dt}Idsim = \frac{1}{Ld}Vdref - R \cdot Idsim + \omega \cdot Lq \cdot Iqsim \quad (3)$$
$$\frac{d}{dt}Iqsim = \frac{1}{Lq}Vqref - R \cdot Iqsim + \omega \cdot Ld \cdot Idsim + \omega \cdot \phi$$

$$Tm = (Vdref \cdot Id + Vqref \cdot Iq)/\omega \quad (4)$$

where Vd and Vq are dq-axis command voltage values, Ld and Lq are dq-axis inductances, R is a wiring resistor, and φ is an exciting constant. In this embodiment, dq-axis inductances Ld and Lq use values that vary according to motor constant variation. That is, a previous magnetic field analysis is made for the motor, and the dq-axis current value obtained from the magnetic field analysis result and a value obtained with an inductance map are used. This can reduce errors in the estimated current values even if an inductance variation occurs due to magnetic flux saturation or the like. The dq-axis command voltage values Vdref, Vqref use the values calculated from the following equation (5) by the dq-axis command voltage calculation section 36:

$$Vdref = (\sqrt{6}/\pi) \cdot Vbatt \cdot \sin(\phi v)$$
$$Vqref = (\sqrt{6}/\pi) \cdot Vbatt \cdot \cos(\phi v) \quad (5)$$

The calculated estimated torque value Tm is inputted into the voltage phase calculation section 24 together with an actual torque value T and a command torque value T*. The command torque value T* is a torque target produced by an electronic control device, not shown.

The voltage phase calculation section 24 calculates a deviation ΔT between an actual torque value T and a command torque value T* to calculate a first voltage phase φfb eliminating the deviation ΔT. Based on a deviation ΔTm between the estimated torque value Tm and the command torque value T*, in the same way, a second voltage phase φff eliminating the deviation ΔTm is calculated. Both of the first voltage phase φfb and the second voltage phase φff are calculated from the equations (6) and (7) by means of PI (proportional integration) control.

$$\phi fb = Kpfb(T^* - T) + \frac{Kifb}{s}(T^* - T) \quad (6)$$

$$\phi ff = Kpff(T^* - Tm) + \frac{Kiff}{s}(T^* - Tm) \quad (7)$$

where Kpfb and Kpff are proportional gains, and Kifb and Kiff are integral gains. The obtained first voltage phase φfb and the second voltage phase φff are subjected to weighting addition in a predetermined proportion by the weighting addition section 40. A value obtained by the addition is a voltage phase φv of command voltage. Namely, the voltage phase φv is calculated from the following equation (8):

$$\phi v = \alpha \cdot \phi ff + \beta \phi fb$$

$$\alpha + \beta = 1 \quad (8)$$

where α and β are weighting coefficients. The proportion of α to β is changed so that the proportion (α) of the second voltage phase φff becomes higher as a change rate dT of the command torque value T* is higher. In other words, the proportion of the first voltage phase φfb is lowered in such a region that the change rate dT is high and high response is requested. On the other hand, the proportion of the first voltage phase φfb is increased in such a region that the change rate dT is low and no high response is requested. By changing the proportion of the weighting addition in accordance with the change rate dT in the same way, control errors can be further reduced. Compared to conventional types, especially, control errors can be reduced in a transient region.

An example of the proportions α and β of the weighting addition is shown in the following equation (9). In the calculation method, α (a proportion of the second voltage phase φff) is increased in proportion to the magnitude of a change rate dT of a command torque value T*. For the changing rate dT of the command torque value T*, an upper-limit threshold dTmax and a lower-limit threshold dTmin are provided. If the change rate dT exceeds the upper-limit threshold dTmax, β (a proportion of a first voltage phase φfb) is set to zero, and if the change rate dT is below the lower-limit threshold dTmin, α (a proportion of a second voltage phase φff) is set to zero.

if $dT > dT\text{max}$ $\alpha=1, \beta=0$ if $dT < dT\text{mix}$ $\alpha=0, \beta=1$ else $\alpha = 1/(dT\text{max} - dT\text{min}) \cdot (dT - dT\text{min})$ $$\beta = 1 - \alpha \quad (9)$$

Figure 6:
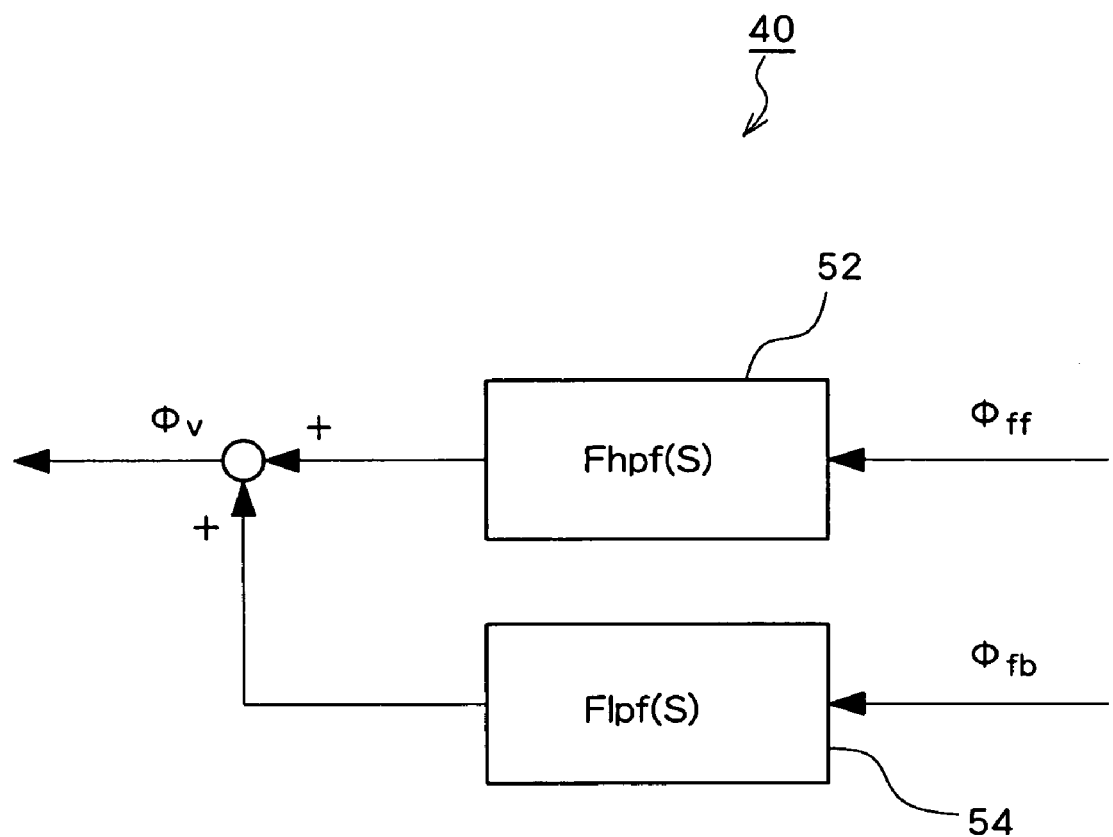
FIG. 6 is a schematic block diagram illustrating another configuration of a weighting addition section.

An example of another weighting addition method is shown in FIG. 6. FIG. 6 is a schematic block diagram illustrating another configuration of a weighting addition section 40. This addition method is established so that the proportion of the second voltage phase φff may become higher as the change rate dT of the command torque value T* is higher, in other words, a frequency of the command torque value T* is higher. Specifically, by applying a low pass filter 54 to a first voltage phase φfb, and a high pass filter 52 to a second voltage phase φff, its output is added. If the frequency of the command torque value T* is high (in the case of a high change rate dT), frequencies of two voltage phases φff, φfb become higher. In this case, as a matter of course, the second voltage phase φff can pass through the high pass filter 52, while the first voltage phase φfb is cut almost entirely by the low pass filter 54. In such a configuration shown in FIG. 6, the proportion of the second voltage phase φfb is increased if the frequency of the command torque value T* is high. On the other hand, if the frequency of the command torque value T* is low, the proportion of the first voltage phase φfb can be increased. This weighting addition method can reduce control errors in the same way as for use of the equation (9).

The voltage phase φv subjected to weighting addition, after being clipped within a predetermined range by the phase limiter 42, is inputted into the rectangular wave generation part 16. The rectangular wave generation part 16 produces a SW signal of the inverter 14 based on a voltage phase φv and a rotor angle θ described above. An output voltage from the inverter 14 as shown in the following equation (10) is applied to the motor 12 to drive the rotation of the AC motor 12.

$0 \leq \theta - \phi v < \pi/3$ $Vu=0, Vv=V\text{batt}, Vw=0$ $\pi/3 \leq \theta - \phi v < 2\pi/3$ $Vu=0, Vv=V\text{batt}, Vw=V\text{batt}$ $2\pi/3 \leq \theta - \phi v < \pi$ $Vu=0, Vv=0, Vw=V\text{batt}$ $\pi \leq \theta - v < 4\pi/3$ $Vu=V\text{batt}, Vv=0, Vw=V\text{batt}$ $4\pi/3 \leq \theta - \phi v < 5\pi/3$ $Vu=V\text{batt}, Vv=0, Vw=0$ $5\pi/3 \leq \theta - \phi v < 2\pi$ $Vu=V\text{batt}, Vv=0, Vw=0$ (10)

As described above, this embodiment provides a voltage phase φv with further reduced control errors by weighting addition of a first voltage phase φfb obtained from an actual torque value and a second voltage phase φff obtained from an estimated torque value. This embodiment provides, especially a high torque response in a transient region and prevention of overshoot. The estimated torque value T may be calculated from the following equation (11) in place of the equation (4).

$$Tm = p \cdot \phi \cdot Iq\text{sim} + p(Ld - Lq) Id\text{sim} \cdot Iq\text{sim} \quad (11)$$

where p is number of poles and φ is an exciting constant. The p·φ·Iqsim at the first term on the right side refers to a magnetic torque, and p(Ld−Lq) Idsim·Iqsim refers to a torque produced by an inductance.

Figure 7:
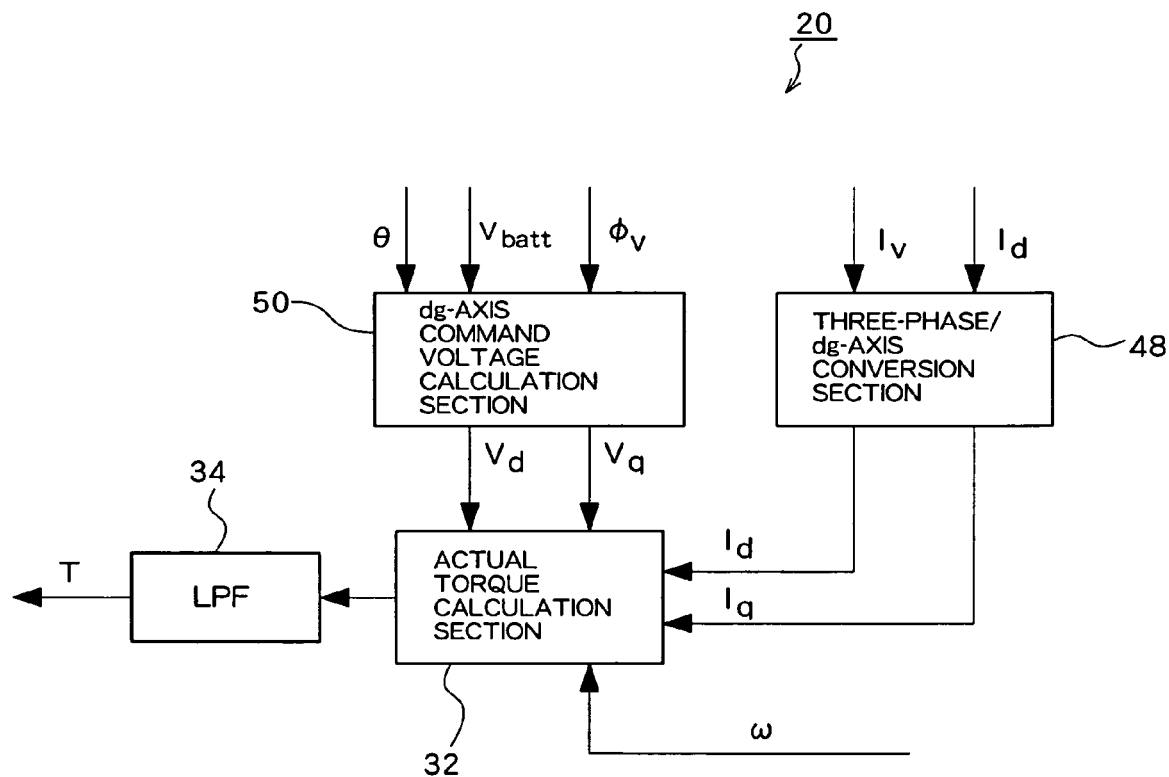
FIG. 7 is a schematic block diagram illustrating another configuration of an actual torque detection section.
Figure 8:
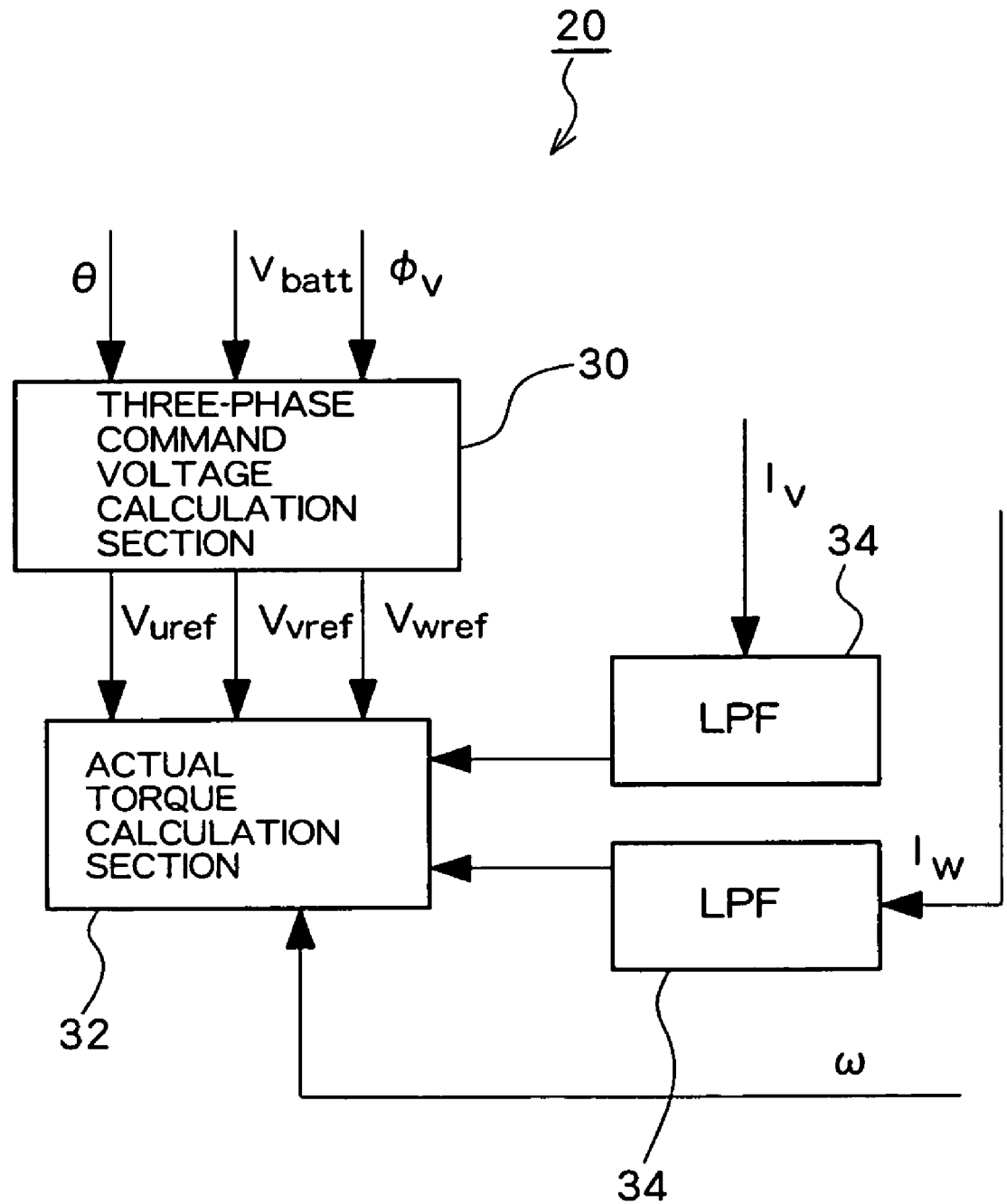
FIG. 8 is a schematic block diagram illustrating another configuration of an actual torque detection section.

This embodiment uses a three-phase current value as a current value used to calculate an actual torque value T and a three-phase command voltage value, but may naturally use a dq-axis current value and a dq-axis command voltage value. In that case, as shown in FIG. 7, a three-phase/dq-axis conversion section 48 and a dq-axis command voltage calculation section 50 are provided for the actual torque detection section 20, and a current value and a voltage value converted on a dq-axis are inputted into the actual torque calculation section 32. The low pass filter may be applied to a current value detected as shown in FIG. 8.

Figure 9:
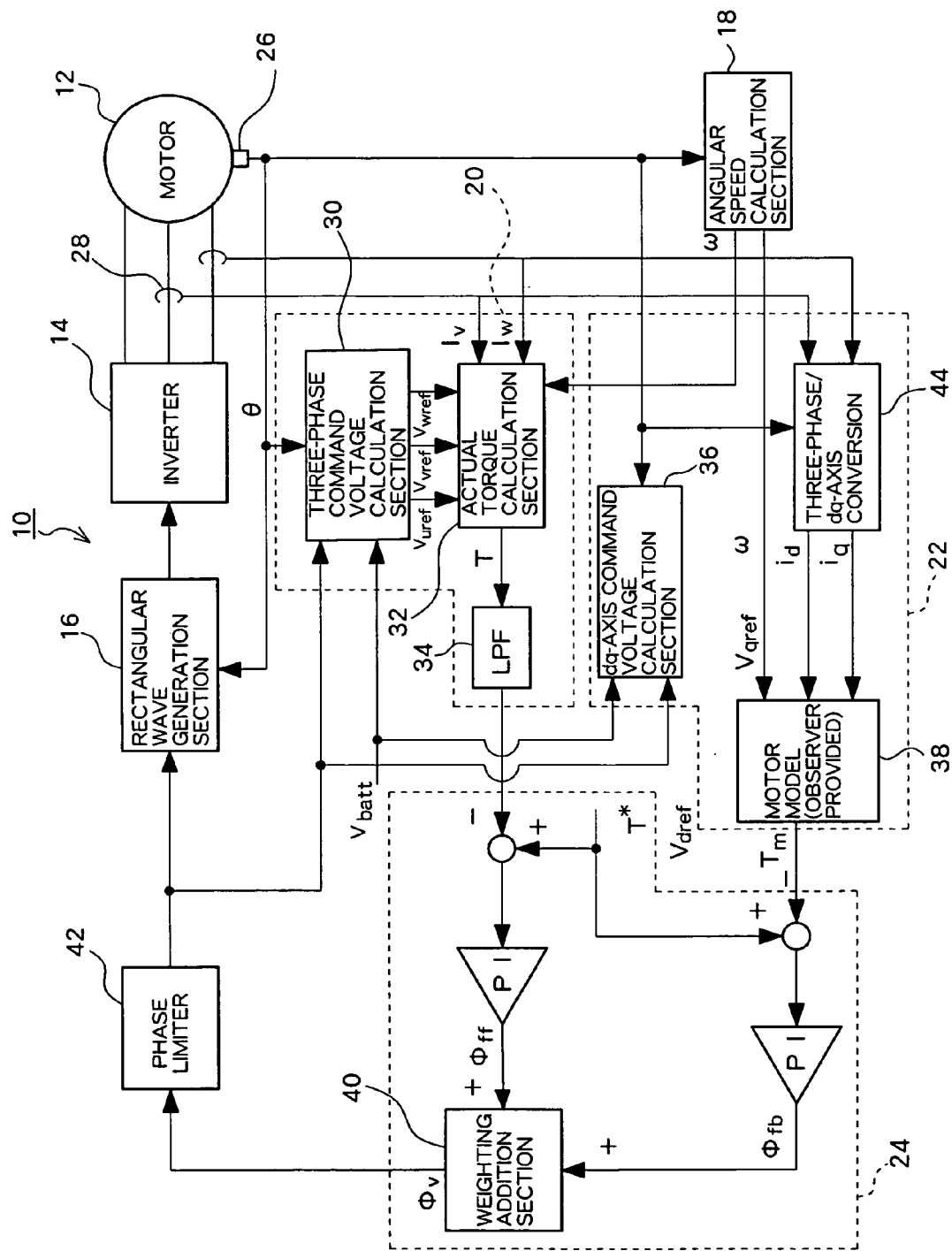
FIG. 9 is a schematic block diagram illustrating a further detailed configuration of a drive control apparatus.

Next, referring to FIG. 9, another embodiment is described below. FIG. 9 is a schematic block diagram illustrating a configuration according to another embodiment. In this embodiment, configurations except those of the estimated torque calculation section 22 are the same as in the foregoing embodiment, and therefore its explanation is omitted.

In this embodiment, the estimated current values Idsim and Iqsim are calculated with an observer constructed out of a Kalman filter. It is well known that the Kalman filter is an algorithm for improving estimated accuracy by sequentially evaluating an error between a measured value and an estimated value. Therefore, in estimating current values Id and Iq with the observer constructed out of the Kalman filter, detected current values Iu, Iv, Iw detected by the current sensor 28 are inputted into the motor model 38. However, the detected current values Iu, Iv and Iw are three-phase current values, and therefore a three-phase/dq-axis conversion section 44 is provided for the estimated torque calculation section 22, and values obtained by converting the three-phase current values into dq-axis current values are inputted into the motor model. The estimated current values Idsim and Iqsim can be expressed by the following equation (12):

$$\frac{d}{dt} Idsim = \frac{1}{Ld}(Vd - R \cdot Idsim + \omega \cdot Lq \cdot Iqsim) + \qquad (12)$$
$$K_{11}(Id - Idsim) + K_{12}(Iq - Iqsim)$$

$$\frac{d}{dt} Iqsim = \frac{1}{Ld}(Vq - R \cdot Iqsim + \omega \cdot Ld \cdot Idsim + \omega \cdot \phi) +$$
$$K_{21}(Iq - Iqsim) + K_{22}(Id - Idsim)$$

where $K_{11}$, $K_{12}$, $K_{21}$, and $K_{22}$ are Kalman gains. The equation (11) has terms for evaluating an error between the estimated values Idsi, and Iqsim and the detected values Id and Iq on the third and fourth terms on the right side. TAn estimated error is therefore sequentially modified. Thus, the estimated current value and the estimated torque value can be estimated more rapidly. The timings for inputting the detected current values Id and Iq into the observer are either before or after noise filtering, but the value at noise filtering can reduce estimated convergence time.

Figure 10:
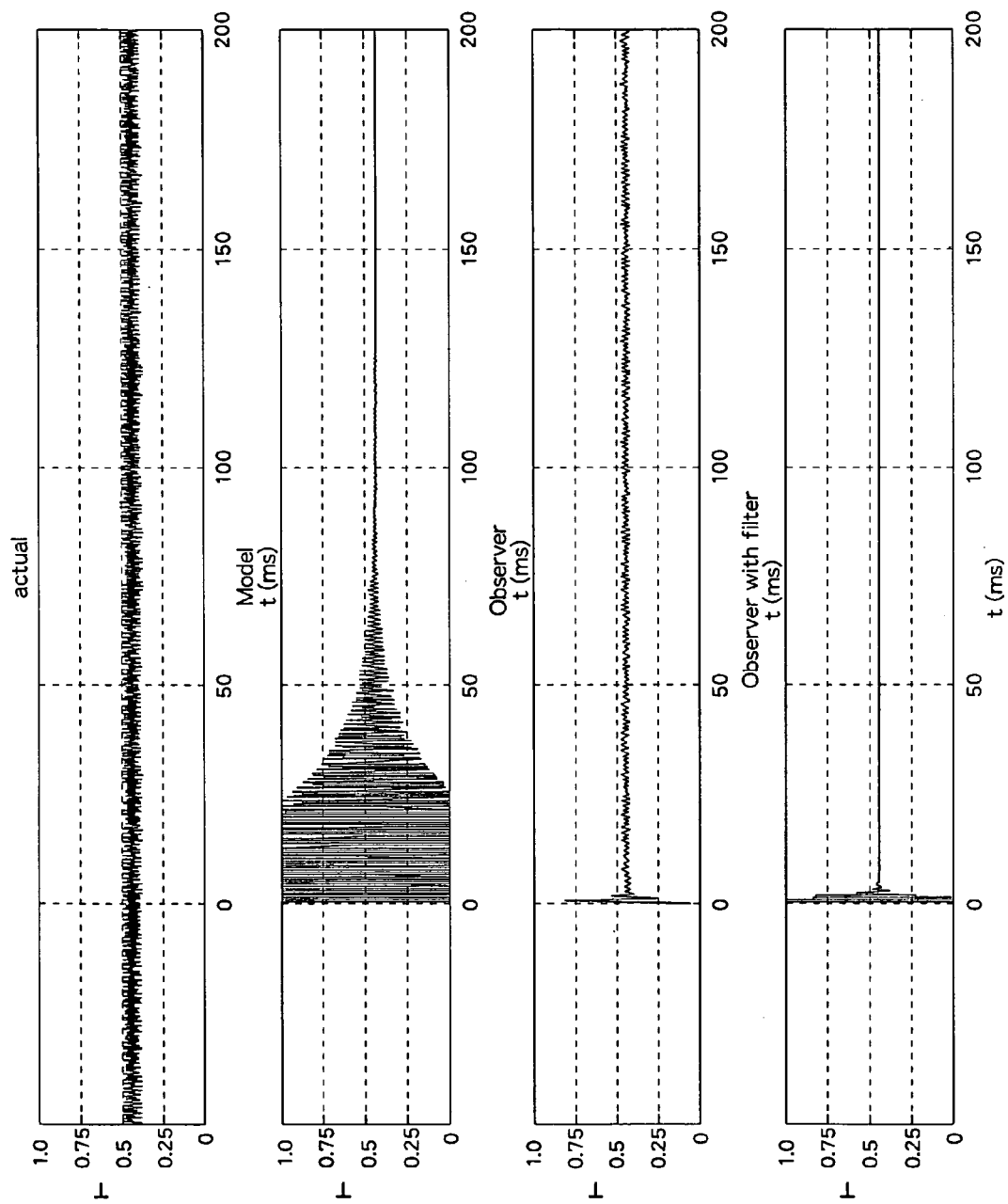
FIG. 10 is a graph showing estimated results of torques.

Referring to FIG. 10, use of the observer and the effect of noise filtering are explained below. FIG. 10 shows, in the order from the above, an actual torque value (before noise filtering), an estimated torque value calculated with a standard motor model (equations (3) and (4)), an estimated torque value (use of a detected current value before noise filtering) calculated with the motor model (equations (12) and (4)), through the use of the observer and estimated torque value (use of a detected current value after noise filtering) calculated with the motor model (equations (12) and (4)) through the use of the observer.

As is obvious in FIG. 10, a standard motor model (a graph at the second stage) requires approx. 130 msec. until an estimated value converges. In a motor model (graphs at the third and fourth stages) using the observer, an estimated value converges at approx. 10 msec. In other words, use of the observer can reduce estimated convergence time significantly compared to the standard motor model. By calculating the voltage phase φv with the estimated torque, control with few control errors can be realized more promptly.

When a detected value before noise filtering is inputted into the observer (a graph at the third stage), micro vibrations remain in the estimated torque value due to the effect of a harmonic component included in the detected current value. On the other hand, when a detected value after noise filtering is inputted into the observer (a graph at the fourth stage), a suitable estimated torque without vibrations can be obtained. By calculating the voltage phase φv with the estimated torque value without vibrations, control errors can be reduced. When the detected value before noise filtering-out is inputted into the observer, an estimated torque value with few vibrations can be obtained in the same way as the estimated results shown in the graph at the fourth stage.

As described above, by providing an observer for the motor model 38, control with few control errors can be achieved with higher rapidity. Use of a value after noise filtering as a detected value for estimated error evaluation can reduce control errors more significantly.

Figure 11:
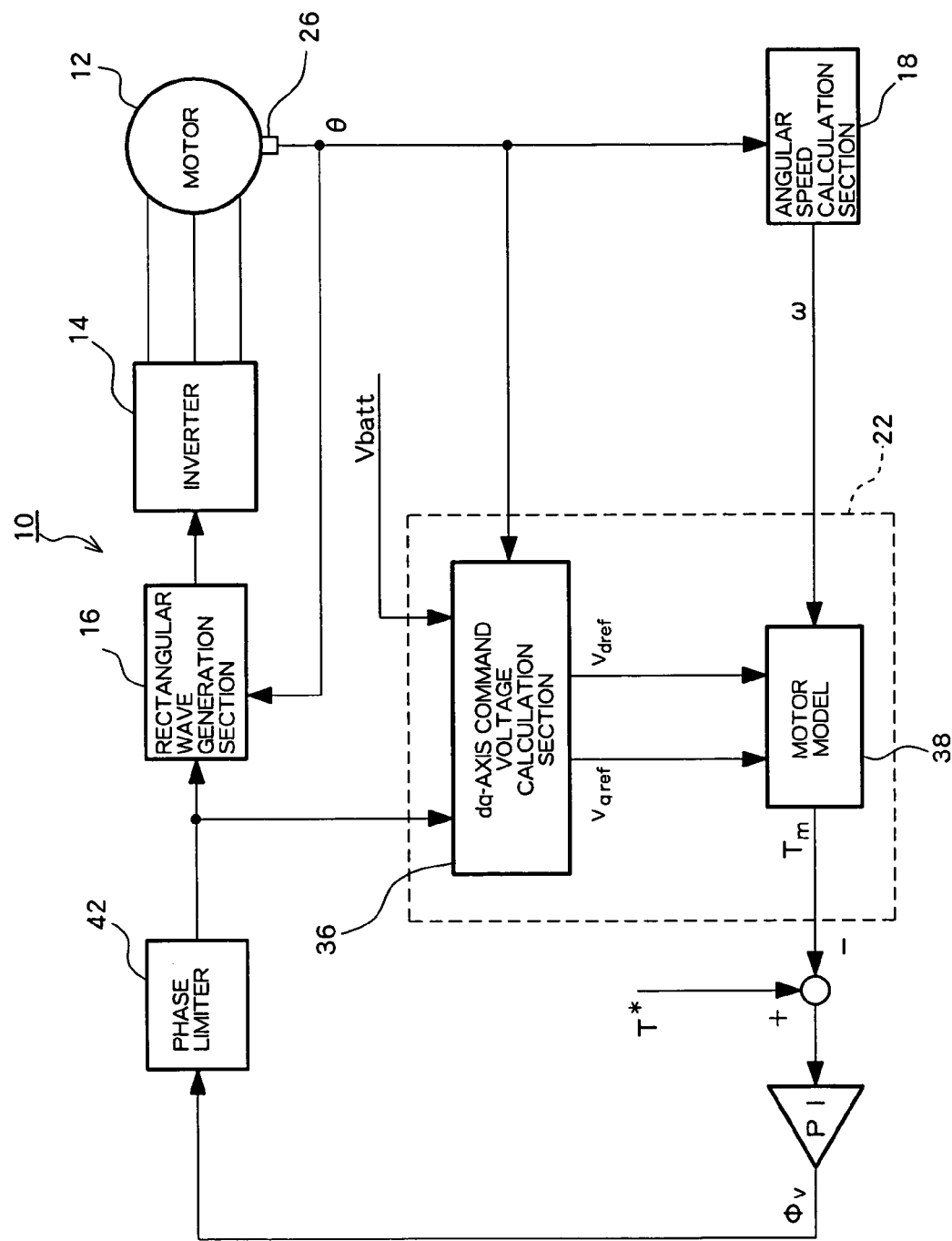
FIG. 11 a schematic block diagram illustrating a configuration of a drive control apparatus according to another embodiment.

Next, referring to FIG. 11, another embodiment is described below. In FIG. 11, the same factors as those in the above embodiment have the same symbols. The drive control apparatus 10 does not detect the actual torque value T, but calculates the voltage phase φv applied to the AC motor 12 based on the estimated torque value Tm and the predetermined command torque value T*.

The estimated torque value Tm is calculated by the estimated torque calculation section 22. The estimated torque calculation section 22 has almost the same configuration to that of the estimated torque calculation section of the drive control apparatus shown in FIG. 5, and includes a dq-axis command voltage calculation section 36 and the motor model 38.

A battery voltage Vbatt and the voltage phase φv (a value on q-axis taken as 0°) are inputted into the dq-axis command voltage calculation section 36. Both these parameters are substituted into an equation (5) to calculate dq-axis command voltage values Vdref and Vqref. The calculated voltage command values are inputted into the motor model 38. The battery voltage Vbatt is a voltage before rectangular wave conversion and a sine wave voltage.

The motor model 38 is a mathematical model that approximates the output torque of the motor 12 with an angular speed ω, a voltage command value and a current value. Specifically, it is a mathematical model shown in an equation (4). The angular speed ω required to calculate the estimated torque value Tm is calculated by an angular speed calculation section 18 and inputted. For the voltage command value, the dq-axis command voltage values Vdref, Vqref calculated by the dq-axis command voltage calculation section 36 are substituted. For the current value, dq-axis estimated current values Idsim, Iqsim calculated from the equation (3) are substituted.

For the estimated torque value Tm calculated by the estimated torque calculation section 22, a difference from the command torque value T* is taken. The obtained difference ΔT is inputted into a PI control system to calculate the voltage phase φv. The voltage phase φv is calculated from the equation (7). The calculated voltage phase vis inputted into a phase limiter 42 and, as necessary, is inputted into a rectangular wave generation section 16 after clipping. The rectangular wave generation part 16 produces a SW signal of an inverter 14. The inverter 14 produces a rectangular wave voltage by a switching operation based on the SW signal and applies the voltage to the AC motor 12.

The estimated torque value Tm is calculated based on the motor model 38 in this way, and a voltage phase φv is calculated based on the estimated torque value Tm, thus enabling motor control with high response. Especially, if a variation in the command torque value T* is large, the drive control apparatus 10 according to this embodiment can rapidly follow the variation, thus reducing control errors.

Figures 12A, 12B:
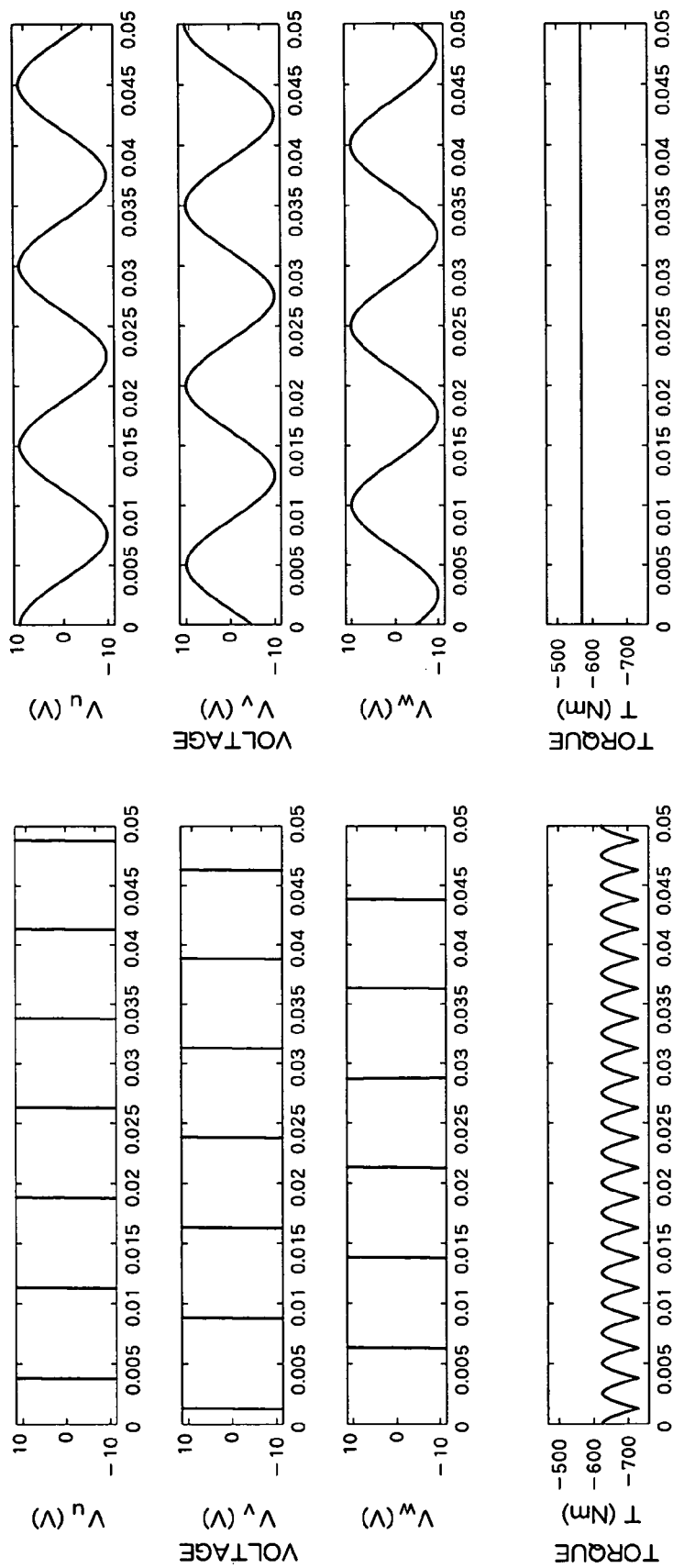
FIG. 12A is a graph showing estimated torque results when rectangular wave voltages are inputted into an estimated torque calculation section.
FIG. 12B is a graph showing estimated torque results when sine wave voltages are inputted into an estimated torque calculation section.

In this embodiment, the dq-axis command voltage values Vdref and Vqref are calculated based on a battery voltage Vbatt as a sine wave voltage. In other words, for dq-axis estimated current values Idsim and Iqsim and the estimated torque value Tm, it may be said that the dq-axis command voltage values Vdref and Vqref are calculated based on a sine wave voltage. By using the sine wave voltage in this way, a favorable estimated torque value Tm without ripples can be obtained. Referring to FIGS. 12A and 12B, the estimated torque results are described below. FIG. 12A is a graph showing estimated torque results when rectangular wave voltages are inputted into an estimated torque calculation section. FIG. 12B is a graph showing estimated torque results when sine wave voltages are inputted into an estimated torque calculation section.

As is evident from FIG. 12, when rectangular wave voltage is used, an abrupt variation or ripple occurs in an estimated torque value Tm in response to a rise or fall in each phase voltage. The estimated torque value Tm in which such a ripple exists cannot be used for motor control as it is and, the voltage phase φv can be calculated only after processing such as ripple removal is applied. Therefore, a filter for noise filtering-out, such as a low pass filter, is essential for removal of a high-frequency component. However, use of the filter causes a time lag in an obtained output torque value, thus degrading torque response.

As shown in FIG. 12B, on the other hand, when an estimated torque value Tm is calculated based on inverter output voltage (sine wave voltage), a stable estimated torque value Tm with no ripples is calculated. Therefore, in this case, the obtained estimated torque value Tm can be used for motor control as it is, namely, the calculation of a voltage phase φv. Thus, motor control with high response can be performed without the need for a filter for noise filtering.

Figure 13B:
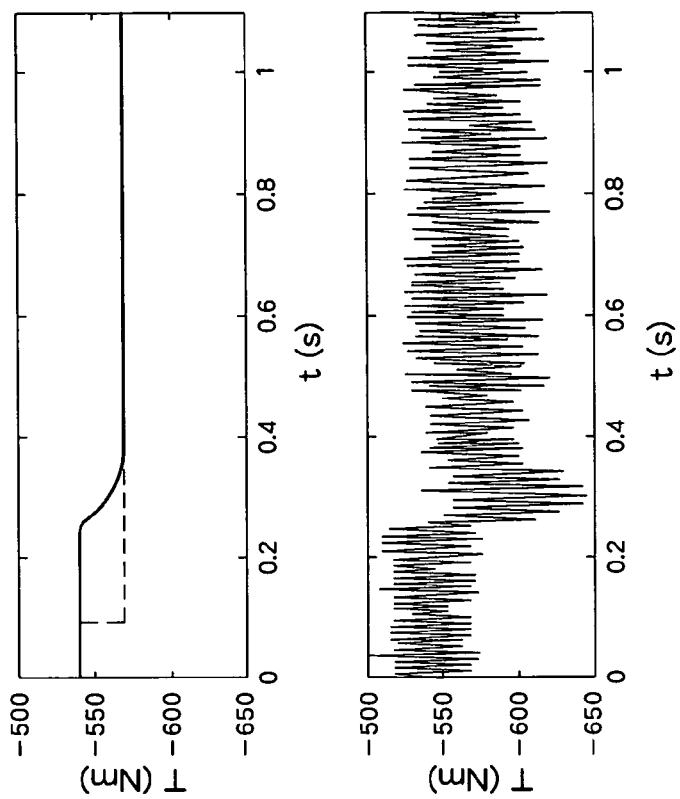
FIG. 13B is a graph showing results when a motor is controlled with rectangular wave voltages.
Figure 13A:
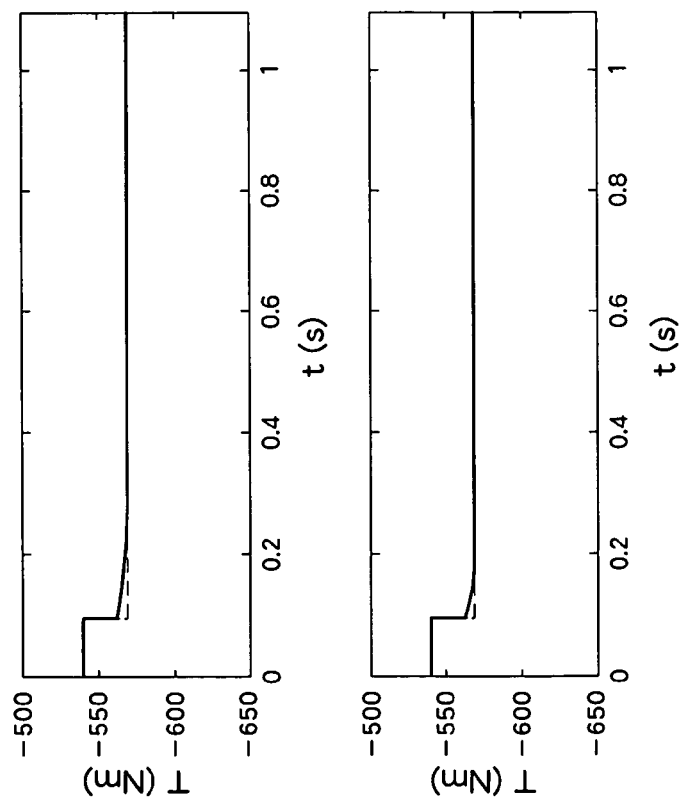
FIG. 13A is a graph showing results when a motor is controlled with sine wave voltages.

FIG. 13A is a graph showing results when a motor is controlled with sine wave voltages. FIG. 13B is a graph showing results when a motor is controlled with rectangular wave voltages. Each figure shows, at its lower stage, the result obtained by applying the estimated torque value calculated without the need for noise filtering-out to control as it is. In the graph, a solid line indicates an actual torque value and a broken line indicates a command torque value.

As is evident from FIG. 13A, actual torque can rapidly follow command torque when motor control is performed with a sine wave voltage and motor control can be realized highly accurately without the need for a low pass filter.

In the case of use of rectangular wave voltage, on the other hand, FIG. 13B (upper stage) shows that an actual torque value is affected by a high-frequency component if the low pass filter is inapplicable, and thus the torque value varies significantly. In the case of use of the low pass filter, on the other hand, FIG. 13B (lower stage) indicates that the high-frequency component of the actual torque value can be reduced. However, torque response is seriously degraded by the effect of the low pass filter. That is, use of rectangular wave voltage makes it difficult to perform motor control with high accuracy.

As can be seen from the foregoing description, this embodiment for calculating an estimated torque value Tm with sine wave voltage provides highly accurate motor control with higher response. In this embodiment, an estimated torque value Tm is calculated based on a single motor model. However, an observer constructed out of a Kalman filter or the like may be provided for the motor model. In this case, an actually measured value as an evaluation criterion of an estimated value is also inputted into the motor model. For example, in improving the accuracy of an estimated current value, an actual current value is inputted into the motor model, and an error between the actual current value and the estimated current value is sequentially evaluated by the observer. Attachment of the observer enables more highly accurate motor control.

What is claimed is:

1. A drive control apparatus, which controls an AC motor subjected to rotational driving by applying rectangular wave voltage thereto, comprising:
    actual torque detection means for detecting an actual torque value outputted from the AC motor;
    estimated torque calculation means for calculating an estimated torque value based on a motor model with the AC motor in a simulated state; and
    voltage phase calculation means for calculating a voltage phase of command voltage based on the actual torque value, the estimated torque value and a predetermined command torque value,
    wherein the voltage phase calculation means adds an actual parameter based on the actual torque value calculated in the calculation process of the voltage phase to an estimated parameter based on the estimated torque value in a predetermined proportion, and calculates the voltage phase based on the obtained value.

2. The drive control apparatus according to claim 1, wherein the actual parameter is a first voltage phase as a voltage phase of eliminating a deviation of the actual torque value from the command torque value;
    the estimated parameter is a second voltage phase as a voltage phase of eliminating a deviation of the estimated torque value from the command torque value; and
    the voltage phase calculation means calculates a value obtained by adding the first voltage phase to the second voltage phase in a predetermined proportion, as a voltage phase.

3. The drive control apparatus according to claim 2, wherein both of the first voltage phase and the second voltage phase are calculated by a control system which takes a deviation from the command torque value as an input and the voltage phase as an output.

4. The drive control apparatus according to claim 3, wherein the control system is a proportional integration (PI) type.

5. The drive control apparatus according to claim 1, wherein the estimated torque calculation means includes estimated current calculation means for calculating an estimated current value as an estimated supply current value based on a mathematical model obtained by approximating a supply current value supplied to the motor with an inductance, a command voltage value and an angular speed, and calculates an estimated torque value based on the calculated estimated current value.

6. The drive control apparatus according to claim 1, wherein the estimated torque calculation means calculates an estimated torque value with a voltage value before rectangular wave conversion.

7. The drive control apparatus according to claim 5, wherein the mathematical model of the estimated current calculation means includes an observer for sequentially evaluating an error between an actually measured value and an estimated value.

8. The drive control apparatus according to claim 1, wherein a proportion of addition of an actual parameter to an estimated parameter is a variable changing with an operating status of the AC motor.

9. The drive control apparatus according to claim 8, wherein a proportion of addition of an actual parameter to an estimated parameter has a higher proportion of the estimated parameter as a change rate of a command torque value is higher.

10. A drive control apparatus, which controls an AC motor subjected to rotational driving by applying rectangular wave voltage thereto, comprising:
    estimated torque calculation means for calculating an estimated torque value of the AC motor based on a motor model with the AC motor in a simulated state and an inverter output voltage and a motor angular speed; and voltage phase calculation means for calculating a voltage phase of a command voltage based on the calculated estimated torque value and a predetermined command torque value.

11. The drive control apparatus according to claim 10, wherein the estimated torque calculation means calculates a value of the command voltage value based on an inverter output voltage, a voltage phase and a rotor angle, and calculates the estimated torque value by applying the calculated command voltage value to the motor model.

12. The drive control apparatus according to claim 10, wherein the motor model includes an observer for sequentially evaluating an error between an actually measured value and an estimated value.

13. A drive control method, which controls an AC motor subjected rotational driving by applying rectangular wave voltage hereto, comprises:

an actual torque detection process for detecting an actual torque value outputted from the AC motor;

an estimated torque calculation process for calculating an estimated torque value based on a motor model with the AC motor in a simulated state; and a voltage phase calculation process for calculating a voltage phase of command voltage based on the actual torque value, the estimated torque value and a predetermined command torque value, wherein the voltage phase is calculated based on a value obtained by adding an actual parameter based on the actual torque value calculated in the voltage phase calculation process to an estimated parameter based on the estimated torque value in a predetermined proportion.

* * * * *